United States Patent [19]

Elders

[11] 4,147,458

[45] Apr. 3, 1979

[54] ROOF PIN

[76] Inventor: Gerald W. Elders, 38 Yakashba Estates, Prescott, Ariz. 86301

[21] Appl. No.: 807,871

[22] Filed: Jun. 20, 1977

[51] Int. Cl.$^2$ ............................................. E21D 21/00
[52] U.S. Cl. ........................................ 405/259; 85/69
[58] Field of Search .................... 61/45 B; 85/69, 63; 52/155

[56] References Cited

U.S. PATENT DOCUMENTS

| 977,402 | 11/1910 | Rohmer | 85/69 |
|---|---|---|---|
| 2,129,439 | 9/1938 | Noble | 85/69 X |
| 3,896,627 | 7/1975 | Brown | 61/45 B |

FOREIGN PATENT DOCUMENTS

| 1434225 | 2/1966 | France | 61/45 B |
|---|---|---|---|
| 183456 | 4/1963 | Sweden | 85/69 |
| 375314 | 4/1964 | Switzerland | 61/45 B |

*Primary Examiner*—Mervin Stein
*Assistant Examiner*—David H. Corbin
*Attorney, Agent, or Firm*—Cohn, Powell & Hind

[57] ABSTRACT

A roof pin particularly adapted for mine or tunnel roof support in which the strata-gripping assembly has a plurality of locking discs mounted on and carried by one end of an elongate rod, the locking discs being resilient and having a periphery adapted to engage the strata defining the roof pin hole. Spacers are mounted on and carried by the rod end, and are located between and engage each axially adjacent pair of locking discs, the spacers having a periphery located radially inward of the locking disc periphery. A retainer on the rod at opposite ends of the strata-gripping assembly holds the discs and spacers on the rod end. The locking discs have downturned peripheries adapted to engage the roof strata and flex resiliently downwardly and inwardly upon insertion of the pin, and expand upwardly and outwardly upon application of a load force on the pin during roof support. The spacers engage a subjacent locking disc radially inward of the subjacent disc periphery for reinforcing the subjacent disc and permitting the expansion of the disc periphery, and engage a superjacent locking disc radially inward of the superjacent disc periphery for permitting downward flexing of the disc periphery. The spacers include a bearing member that engages the subjacent locking disc, and at least one spacing member that engages the bearing member and the superjacent locking disc, the number of spacing members determining the axial spacing between the locking discs.

6 Claims, 11 Drawing Figures

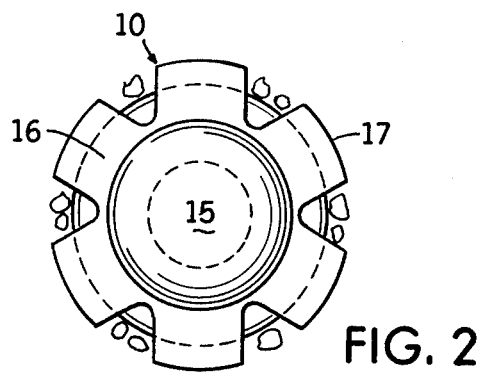
FIG. 2
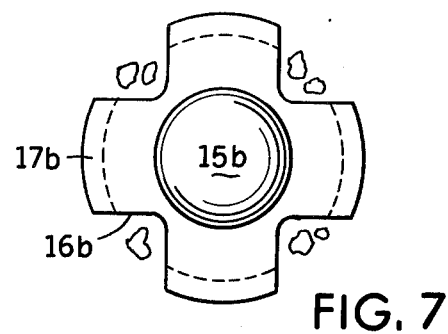
FIG. 7
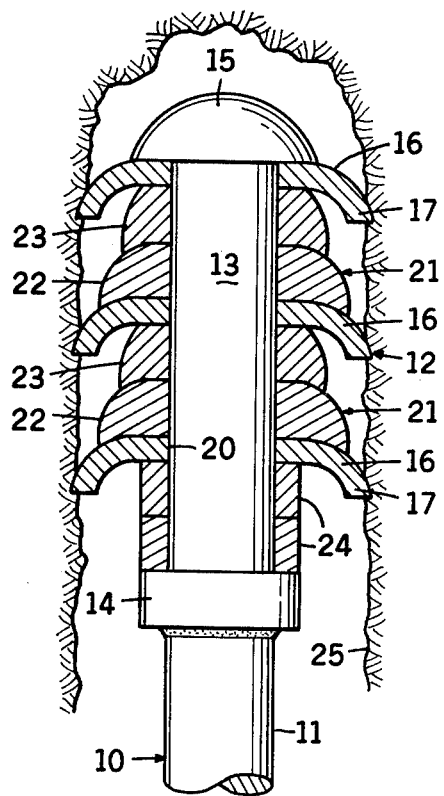
FIG. 1
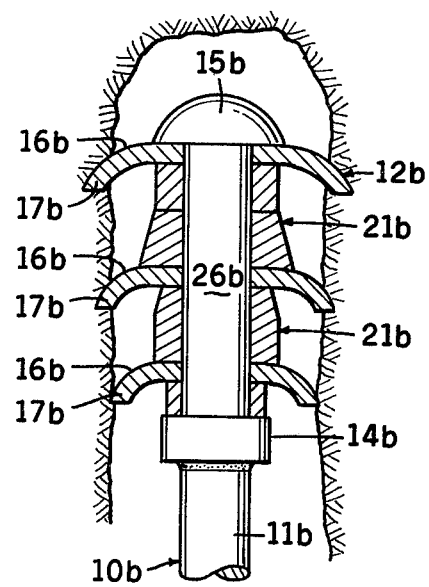
FIG. 6
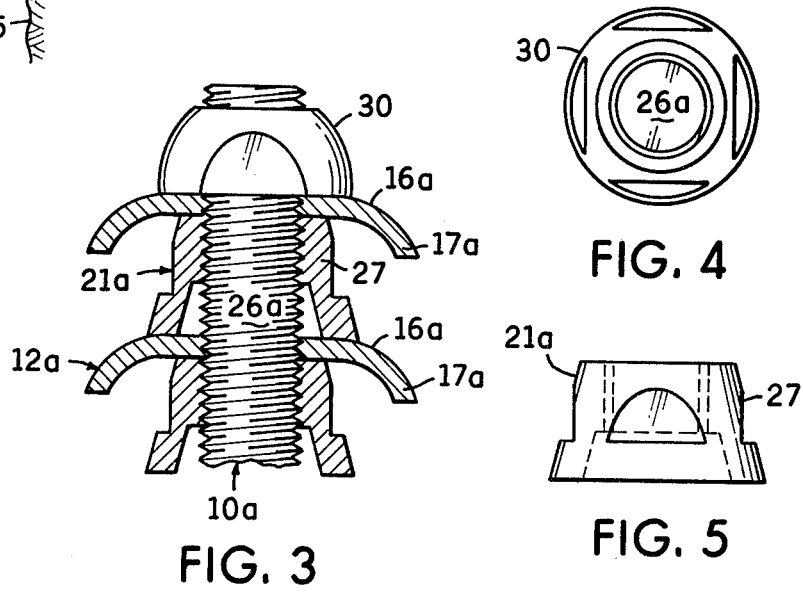
FIG. 3
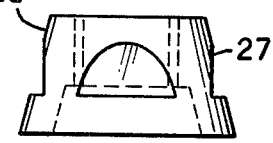
FIG. 4
FIG. 5

ROOF PIN

BACKGROUND OF THE INVENTION

This invention relates generally to improvements in a roof pin used for mine or tunnel roof support, and more particularly to an improved pin assembly that effectively grips the roof strata under support load upon insertion into a compatible pin hole.

The majority of the heretofore conventional types of pins utilize an expansion shell for gripping the roof strata. When utilizing this type of roof pin, the roof pin and expansion shell are inserted into a drilled hole in the roof strata to the desired depth. When fully inserted, the pin, which is in fact a bolt, is turned to expand the expansion shell blades outwardly into gripping relation with the roof strata. With this particular roof pin, the expansion shell must be maintained in the location desired while at the same time the shell blades must be manually expanded.

SUMMARY OF THE INVENTION

The present roof pin is inserted into a drilled hole in the roof strata. The structural arrangement and provision of the locking members on the roof pin enable the locking members to frictionally engage the sides of the pin hole so as to be maintained at any position during insertion, and when fully inserted to the desired depth, the locking members will automatically expand and grip the roof strata upon application of support load.

The present roof pin includes a strata-gripping assembly having a plurality of locking discs mounted on and carried by one end of an elongate rod, the resilient disc being resilient and having a periphery adapted to engage the roof strata defining the pin hole, and having spacer means mounted on and carried by the pin end and located between and engaging each axially adjacent pair of locking discs, the spacer means having a periphery located radially inward of the locking disc periphery. Retaining means on the rod at opposite axial ends of the strata-gripping assembly hold the discs and spacer means on the rod.

The resilient locking discs have downturned peripheries adapted to engage the strata and to flex resiliently downwardly and inwardly upon insertion of the pin, and to expand upwardly and outwardly upon application of support load on the pin.

The spacer means engages a subjacent locking disc radially inward of the subjacent disc periphery for reinforcing the subjacent disc and for permitting the expansion of the disc periphery, and engages a superjacent locking disc radially inward of the superjacent disc periphery for permitting downward flexing of the disc periphery.

The spacer means includes a bearing member that engages the subjacent locking disc, and at least one spacing member that engages the bearing member and the superjacent locking disc, the number of spacing members determining the axial spacing between adjacent locking discs.

In one embodiment, each axially successive superjacent locking disc on the rod has a greater peripheral dimension than the next axially subjacent locking disc, whereby each successive superjacent locking disc can move further radially outward than the next subjacent locking disc.

In another embodiment, a plurality of locking members are mounted on the elongate rod, each locking member having a radially extending resilient portion. The locking members are located in adjacent superimposed relation on the pin end with the radially extending resilient portions being located in various angular positions about the pin axis to provide a substantially circular envelope periphery engageable with the roof strata. In one species, the locking member has a single radially extending resilient portion, and in another species, the locking member has a pair of opposed, radially extending resilient portions.

BRIEF DESCRIPTION OF THE DRAWINGS

FIG. 1 is a fragmentary, cross sectional view of the roof pin inserted in a pin hole;

FIG. 2 is a top plan view of the roof pin of FIG. 1;

FIG. 3 is a fragmentary, cross sectional view of another embodiment of the roof pin;

FIG. 4 is a top plan view of the spacer means utilized in the embodiment of FIG. 3;

FIG. 5 is a side elevational view of the spacer means utilized in the embodiment of FIG. 3;

FIG. 6 is a fragmentary, cross sectional view of another embodiment of the roof pin inserted in a pin hole;

FIG. 7 is a top plan view of the pin of FIG. 6;

DESCRIPTION OF THE PREFERRED EMBODIMENTS

Figure 9:
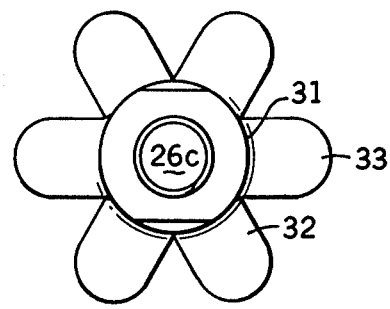
FIG. 9 is a top plan view of the pin of FIG. 8.

Referring to the roof pin generally indicated by 10 in FIGS. 1 and 2, it will be understood that the roof pin 10 includes an elongate rod 11 having a strata-gripping assembly indicated by 12 attached to one end 13 of rod 11. The strata-gripping assembly 12 is held by retaining means consisting of an upset rod shoulder 14 and a cold-headed rod end 15.

The strata-gripping assembly includes a plurality of resilient locking discs 16, constituting locking members, made of spring steel, and having either a continuous or interrupted periphery 17. Each locking disc 16 has a center aperture 20 so as to enable the disc 16 to be slip-fitted over the rod end 13. The periphery 17 of the locking disc 16 is downturned to engage the roof strata and flex resiliently downwardly and inwardly upon insertion of the roof pin and to expand upwardly and outwardly upon application of support load.

Spacer means referred to by 21 are mounted on and carried by the rod end 13, and are located between and engage each axially adjacent pair of locking discs 16, the spacer means 21 having a periphery located radially inward of the locking disc periphery 17. More particularly, the spacer means 21 engages a subjacent locking disc 16 radially inward of the subjacent disc periphery 17 for reinforcing the subjacent disc 16 and for permitting expansion of the subjacent disc periphery 17, and engages a superjacent locking disc 16 radially inward of the superjacent disc periphery 17 for permitting downward flexing of the superjacent disc periphery 17.

More particularly, the spacer means 21 includes a bearing member 22 that engages the subjacent locking disc 16, and at least one spacing member 23 that engages the bearing member 22 and the superjacent locking disc 16, the number of spacing members 23 determining the axial spacing between adjacent locking discs 16. The bearing member 22 and spacing member 23 are also slip-fitted on the rod end 13. In FIG. 1, a pair of spacing washers 24 are slip-fitted on the rod end 13 and bear against the retaining shoulder 14 and the first locking disc 16.

To assemble the strata-gripping assembly, the spacing washers 24 are first slipped on the rod end 13 to engage the retaining shoulder 14, and then the locking discs 16 are slipped on the rod end 13 with the appropriate bearing member 22 and spacing member 23 located between axially adjacent locking discs 16. The pin end 15 is then cold-rolled to secure the strata-gripping assembly.

To utilize this roof pin 10, an appropriate pin hole 25 is drilled in the roof to the desired depth. Then, the roof pin 10 is inserted into the pin hole 25, the downturned peripheries 17 of the locking discs 16 engaging the strata and flexing downwardly and inwardly until the strata-gripping assembly 12 is located at the desired depth in the pin hole 25. The locking disc peripheries 17 are resiliently flexed outwardly into gripping engagement with the strata, and upon application of a support load on the roof pin 10, the locking disc peripheries 17 dig deeper into the roof strata and expand upwardly and outwardly into even more effective gripping relation with the strata.

In the embodiment of FIGS. 3–5, the roof pin 10a has a threaded rod end 26a. The locking discs 16a are slip-fitted over the rod end 26a. However, the spacer means 21a is of a unitary construction consisting of a nut 27 that is threadedly attached to the rod end 26a between axially adjacent locking discs 16a. Instead of cold-rolling the rod end as in the embodiment of FIG. 1, a lock nut 30 is threadedly attached to the rod end 26a and serves to hold the strata-gripping assembly 12a on the roof pin end 26a.

The strata-gripping assembly 12a of FIGS. 3–5 is assembled substantially in the same manner as described with respect to the embodiment of FIG. 1 except that the spacer means 21 and the end lock nut 30 are threadedly attached to the rod end 26a. The purpose and function of the spacer means 21a of FIGS. 3–5 are the same as the spacer means 21 of the embodiment of FIG. 1. Moreover, the installation of the roof pin and the functional purpose and cooperation of the locking discs 16a and spacer means 21a of the embodiment of FIGS. 3–5 are the same as that previously described with respect to the embodiment of FIG. 1.

In the embodiment of FIGS. 6–7, the roof pin 10 is provided with an upset shoulder 14b and a cold-headed rod end 15b constituting a retaining means for the strata-gripping assembly 12b.

Each axially successive superjacent locking disc 16b on the rod end 26b has a greater peripheral dimension than the next axially subjacent locking disc 16b, whereby each successive superjacent locking disc 16b can move further radially outward than the next subjacent locking disc 16b upon application of a support load to the roof pin 10b in the event of any tendency for the roof pin 10b to move outwardly of its hole, the locking discs 16b would expand upwardly and outwardly into undisturbed strata for effective gripping action.

The spacer means 21b can consist of unitary members or separate bearing members and spacing members as in FIG. 1. The purpose of the spacer means 21b is the same as that previously described with respect to the embodiment of FIG. 1.

Figure 10:
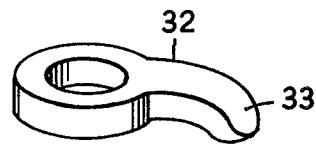
FIG. 10 is a perspective view of the locking member utilized in the roof pin of FIG. 8.
Figure 8:
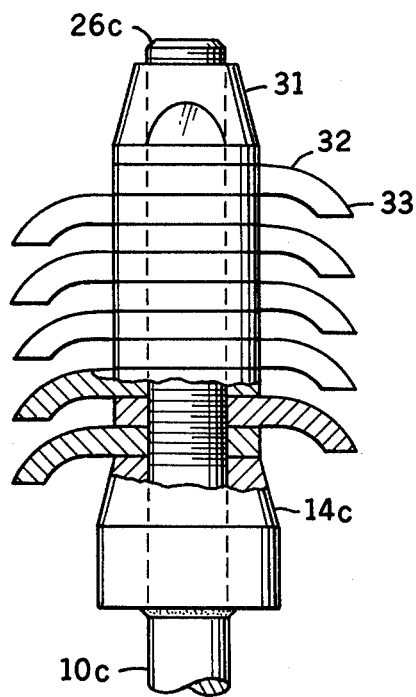
FIG. 8 is a fragmentary, cross sectional view of another embodiment of the roof pin.

In the embodiment of FIGS. 8–10, the roof pin 10c includes a threaded rod end 26c, and a retaining shoulder 14c and a lock nut 31 constituting retaining means for securing the strata-gripping assembly 12c. The strata-gripping assembly 12c includes a plurality of locking members 32 slip-fitted on the rod end 26c, each with a radially extending resilient portion 33. More particularly, locking members 32 are located in superimposed relation with the radially extending resilient portions being located in various angular positions about the pin axis to provide a substantially circular envelope periphery engageable with the strata defining the pin hole.

The radially extending resilient portions 33 are downturned and adapted to engage the roof strata and flex resiliently downwardly and inwardly upon insertion of the pin, and to expand upwardly and outwardly upon application of support load, similar to the action and function of the peripheries 17 of the locking disc 16 in the embodiment of FIG. 1.

Figure 11:
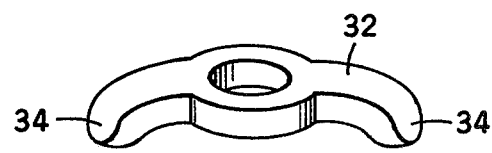
FIG. 11 is a perspective view of another embodiment of the locking member that can be used in the pin of FIG. 8.

FIG. 11 discloses a modification of the locking element 33 that can be utilized in the embodiment of FIG. 8. This locking member 33 has a pair of opposed, radially extending resilient portions. It can be used in lieu of or in combination with the locking members 32 of the embodiment of FIG. 8. The purpose and function of the radially extending resilient portions 34 are the same as the resilient portions 33 of locking member 32.

I claim as my invention:

1. A roof pin for insertion into a preformed hole in a roof comprising:
    (a) an elongate rod,
    (b) a strata-gripping assembly including:
        (1) a plurality of locking discs mounted on and carried by one end of the rod, the locking discs being of resilient steel and having a periphery adapted to engage the strata defining the roof pin hole, and
        (2) spacer means mounted on and carried by the rod end, and located between and engaging each axially adjacent pair of locking discs, the spacer means having a periphery located radially inward of the locking disc periphery,
    (c) retaining means on the rod at opposite ends of the strata-gripping assembly for holding the discs and spacer means on the rod, and
    (d) the locking discs peripheries are turned toward the opposite end of the rod for engaging the strata and flexing resiliently inwardly upon insertion of the strata-gripping assembly as a unit into the roof hole and for expanding outwardly into the strata upon application of load force on the pin.

2. A roof pin for insertion into a preformed hole in a roof, comprising:
    (a) an elongate rod,
    (b) a strata-gripping assembly including:
        (1) a plurality of locking discs mounted on and carried by one end of the rod, the locking discs being of resilient steel and having a periphery adapted to engage the strata defining the roof pin hole, and
        (2) spacer means mounted on and carried by the rod end, and located between and engaging each axially adjacent pair of locking discs, the spacer means having a periphery located radially inward of the locking disc periphery,
    (c) retaining means on the rod at opposite ends of the strata-gripping assembly for holding the discs and spacer means on the rod, (d) the locking discs peripheries being turned toward the opposite end of the rod for engaging the strata and flexing resiliently inwardly upon insertion of the pin into the roof hole and for expanding outwardly into the strata upon application of load force on the pin, and (e) the spacer means engaging a subjacent locking disc radially inward of the subjacent disc periphery for reinforcing the subjacent disc and permitting expansion of the disc periphery, and engaging a superjacent locking disc radially inward of the superjacent disc periphery, the engagement of the spacer means with the subjacent locking disc being radially outward of the engagement of the spacer means with the superjacent locking disc, for permitting inward flexing of the superjacent disc periphery.

3. A roof pin for insertion into a preformed hole in a roof, comprising:

(a) an elongate rod, (b) a strata-gripping assembly including:

(1) a plurality of locking discs mounted on and carried by one end of the rod, the locking discs being of resilient steel and having a periphery adapted to engage the strata defining the roof pin hole, and (2) spacer means mounted on and carried by the rod end, and located between and engaging each axially adjacent pair of locking discs, the spacer means having a periphery located radially inward of the locking disc periphery, (c) retaining means on the rod at opposite ends of the strata-gripping assembly for holding the discs and spacer means on the rod, (d) the locking discs peripheries being turned toward the opposite end of the rod for engaging the strata and flexing resiliently inwardly upon insertion of the pin into the roof hole and for expanding outwardly into the strata upon application of load force on the pin, and (e) each axially successive superjacent resilient steel locking disc on the rod has a greater peripheral dimension than the next axial subjacent resilient steel locking disc whereby each successive superjacent locking disc periphery can expand further radially outwardly into the strata than the next subjacent locking disc periphery.

4. A roof pin for insertion into a preformed hole in a roof, comprising:

(a) an elongate rod, (b) a strata-gripping assembly including a plurality of steel locking members, each with a radially extending resilient steel portion, mounted on and carried by one end of the rod, the resilient steel portions being turned toward the opposite end of the rod for engaging the strata and flexing resiliently inwardly upon insertion of the strata-gripping assembly as a unit into the roof and for expanding outwardly into the strata when inserted, the locking members being located in adjacent superimposed relation with the radially extending portions located at various angular positions relative to the rod axis and located at different angular positions to the radially extending portions of axially adjacent locking members to provide a substantially axially cylindrical envelope periphery engageable with the strata defining the pin hole, and (c) retaining means on the rod at opposite ends of the strata-gripping assembly for holding the locking members on the rod.

5. A roof pin as defined in claim 4, in which:

(d) each locking member has a single radially extending resilient steel portion.

6. A roof pin as defined in claim 4, in which:

(d) each locking member has a pair of opposed, radially extending resilient steel portions.

* * * * *